J. J. BEITLER.
RUBBER TIRE.
APPLICATION FILED SEPT. 22, 1911.
1,036,516.
Patented Aug. 20, 1912.
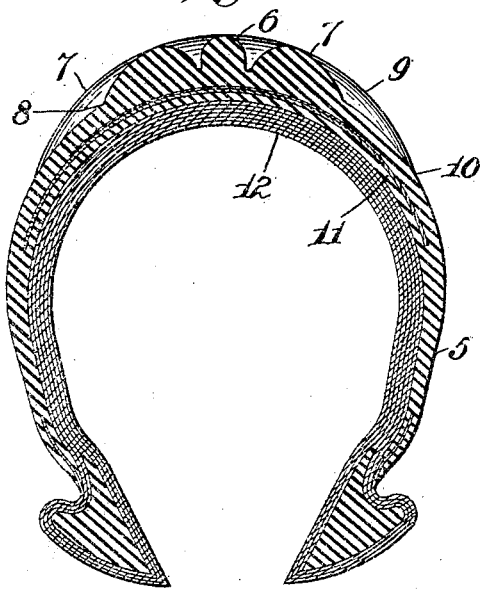
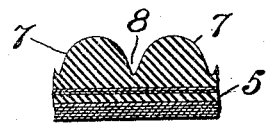
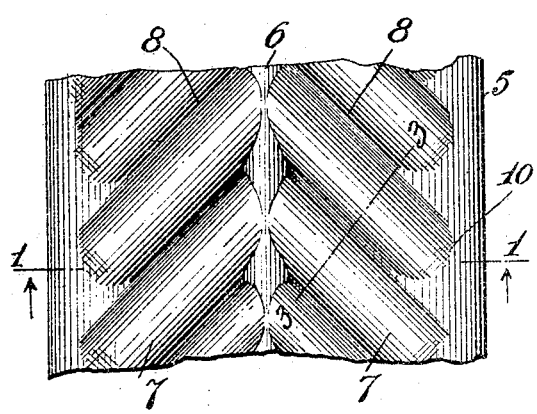
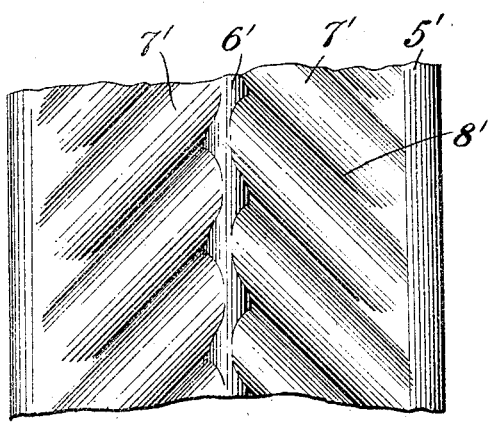
Attest:
Inventor:
Jesse J. Beitler
by
Garry P. Van Wye
Atty.

UNITED STATES PATENT OFFICE.

JESSE J. BEITLER, OF NEW YORK, N. Y., ASSIGNOR TO HENRY C. BEITLER, OF CHICAGO, ILLINOIS.

RUBBER TIRE.

1,036,516.    Specification of Letters Patent.    Patented Aug. 20, 1912.

Application filed September 22, 1911. Serial No. 650,754.

*To all whom it may concern:*

Be it known that I, JESSE J. BEITLER, a citizen of the United States, residing at New York, in the county and State of New York, have invented a new and useful Rubber Tire, of which the following is a specification.

This invention relates to rubber tires, and especially to that class having raised portions on the tread thereof adapted to prevent skidding; and the objects of my invention are: first, to provide a tire with raised portions on the tread so constructed and disposed that they will be self-cleaning in use; second, that they will increase the wearing qualities of the tire; third, that will prevent the tires sinking into the sand on sandy roads; and, fourth, that will not retard the speed of a machine, or automobile.

The invention is illustrated in the accompanying drawing, in which—

Figure 1, is a cross section of a tire shoe, constructed according to my invention, taken on the line 1—1 of Fig. 2; Fig. 2, is a plan view of a portion thereof; Fig. 3, is a sectional view of a portion of the shoe, taken on the line 3—3 of Fig. 2; and, Fig. 4, is a view similar to Fig. 2, but showing a modified form of construction.

In the accompanying drawing, similar numerals of reference refer to the same parts in each of the views.

As shown in the drawings I provide a shoe 5, with a longitudinal rib 6, substantially central of the tread thereof, and with a plurality of short ribs 7, which extend from the central rib 6, at an angle, preferably outwardly and backwardly, as will be readily understood if the portion of the tire shown in Fig. 2, is taken as the top of the wheel moving in the direction of Fig. 1.

The rib 6, is rounded so as to present no flat surface to the roadbed; and the ribs 7, are also rounded and so disposed as to leave no flat surface between adjacent ribs whereby a channel 8, is formed between the ribs substantially of the form shown in Fig. 3. The ribs 7, connect with the rib 6, in the plane of its periphery, and continue outwardly therefrom for a considerable distance on the same radius as the radius of the periphery of the said rib 6; and from a point as 9, are gradually reduced in height until they end in the side of the tire at 10.

By making the rib 6, and the ribs 7, in this way, as soon as a load is put on the periphery of the wheel, the rib 6, will be depressed. As the ribs 7, are on the same radius, as soon as the rib 6, is depressed even slightly the load will be taken up by the portions of the ribs 7, adjacent to the rib 6, increasing as the tire is depressed, thereby distributing the load over the entire tread, as will be readily understood, and thereby preventing the tearing of the rubber 11, from the canvas 12.

As the load is removed from the ribs 6, and 7, these ribs will spring outwardly to normal position, and as the channels 8, are substantially pyramidal in form in cross section, the outward spring of the ribs, and the centrifugal motion of the wheel will easily dislodge any mud, or sediment in the channels between the ribs thereby making the tread self cleansing. Thus the tires will have the highest efficiency at all times against skidding, which would not be the case if the channels were allowed to clog, or fill up with dirt. Further, as the space between the ribs 7, is substantially pyramidal in form in cross section, it is evident that in going through sand, the round ribs will tend to pack the sand in the channels while the wheel is passing over the same, thereby forming a support for the wheel which will enable it to move forward instead of burying itself in the sand, as often occurs with rubber tired wheels.

It will thus be seen that I have provided a tire with means to hold the same against skidding at all times, and that without any air pockets, or other features which would retard the speed of the vehicle using the same. By making the ribs rounded, and the channels without any flat surface I am able to produce a tire which will have the highest possible life for any wheel, and have less chance for strain by the wheel engaging any object.

While I have shown my invention as applied to a shoe for a tire, it is evident that it could be just as readily, and as efficiently applied to a solid rubber tire.

In Fig. 4, I have shown a slight modification in that the tire 5', has the ribs 7', engaging the rib 6', alternately whereby the top of one rib 7', engages the rib 6', opposite a channel 8', on the other side of the rib 6', as will be readily seen. The construction, operation, and advantages are otherwise practically the same as in the preferred form wherein the ribs 7, meet the rib 6, oppositely. This form is introduced more to show that the ribs 7, may be varied in disposition rather than for any advantage that might accrue therefrom, although by staggering the ribs 7, the rib 6, might be somewhat strengthened.

Having thus described my invention, what I claim as new and desire to secure by Letters Patent of the United States, is—

1. A rubber tire having a longitudinal rib on the tread thereof, and a plurality of ribs connected therewith and extending outwardly and backwardly therefrom, all of said ribs being rounded, and said lateral ribs being so disposed that the rounded sides of the adjacent ribs will meet to form a rounded intervening channel, for the purpose set forth.

2. A rubber tire having a longitudinal rib on the tread thereof, and a plurality of ribs connected therewith and extending outwardly and backwardly therefrom; all of said ribs being rounded, and said lateral ribs being so disposed that the rounded sides of the adjacent ribs will meet to form a rounded, intervening channel, said lateral ribs being on the same radius as the tread of said longitudinal rib, for the purpose set forth.

Dated this 20th day of September, 1911.

JESSE J. BEITLER.

Witnesses:
E. A. WEST,
V. L. SEE.